Dec. 17, 1963

N. G. KANE 3,114,515

FLEXIBLE TAPE RULE

Filed Sept. 28, 1962

2 Sheets-Sheet 1

INVENTOR.
NEIL G. KANE

BY

B. B. Olive

ATTORNEY

INVENTOR.
NEIL G. KANE
BY
B. B. Olive
ATTORNEY

United States Patent Office 3,114,515

Patented Dec. 17, 1963

3,114,515

FLEXIBLE TAPE RULE

Neil G. Kane, Santa Fe Springs, Calif., assignor to H. K. Porter Company (Delaware), Danville, Va., a corporation of Delaware Filed Sept. 28, 1962, Ser. No. 226,860
4 Claims. (Cl. 242—107.3)

This invention relates to flexible tape rules of the type in which the tape is coiled in a case and is withdrawn under tension of a spring. More specifically, the invention is concerned with improved means for applying a releasable braking force against the tension of the spring so that the tape can be retained in any given extended position.

In the prior art there have been principally two arrangements for braking flexible tape rules of the type with which this invention is concerned. In the older arrangement, the tension spring is coiled inside of a drum on the outside of which the tape is wound and braking is effected by braking the drum which, in effect, brakes the tape. This shows up in the early Patent 700,698 and has been carried down in various forms in other patents of more recent date. In another more recent arrangement, the braking force is applied directly to the face of the tape as found for example in Patent 2,814,881. The first arrangement has the disadvantage of requiring the presence of a drum and the second arrangement has the disadvantage of having some tendency to wear the tape surface on which the indicia is printed. Departing from these prior art arrangements, the present invention requires neither a drum nor a force applied to the face of the tape but rather is directed to a braking arrangement which allows the tape to be directly connected to the spring and the braking force to be applied to an edge of the tape rather than to the tape surface or an intermediate drum.

With the above in mind, a principal object of the invention is to eliminate the need for a drum in a flexible tape rule braking arrangement.

Another object is to provide a braking arrangement for a flexible tape rule which does not introduce wear on the printed tape surface.

Another object is to provide a braking arrangement for a flexible tape rule which requires a minimum of assembly parts and therefore can be inexpensively manufactured.

These and other objects will be apparent from the following description and drawings.

Figure 1:
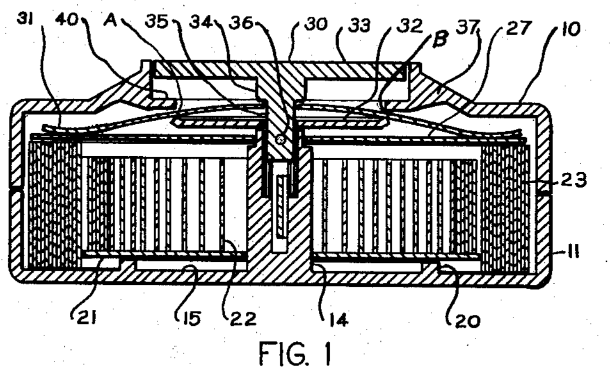
FIGURE 1 is an elevation section view taken through the center of the rule showing the tape under braking action.

Prior to describing the invention in detail it may be said that in the embodiment shown in the drawings the structure of the invention provides for the spring and the tape to be connected together and the tape coiled around the spring. The described structure further employs a case having bottom and top sections and in the center of the bottom section there is mounted a post to which the fixed end of the spring is attached and around which the spring and tape are coiled. One edge of the tape frictionally engages the inside of the bottom section and the other edge engages a thin disc which is mounted on the post. This disc is pressed directly against the edge of the tape by means of a curved flexible leaf spring which asserts a braking force exceeding the normal retracting spring force. The leaf spring is mounted in the top section of the case and which is arranged so that the ends of the spring automatically engage the disc and press the disc against the edge of the tape when the two sections of the case are assembled. The leaf spring itself is mounted on the stem of a push button which engages the leaf spring and which can be depressed from outside the case. As the push button is depressed, the middle of the leaf spring engages a relatively fixed member located between the leaf spring and the disc causing the leaf spring ends to flex away from the disc which relieves the disc from the leaf spring tension. Thus, the braking action can be released anytime simply by depressing the push button. I have found this system of braking to give an extremely smooth action and will now refer to the structure of this embodiment in detail.

Referring to the various figures, the device includes a case which comprises a top cover 10 and a bottom cover 11. The top cover 10 and the bottom cover 11 are held together by suitable threaded screws, not shown, which reside in and extend through holes indicated at 13 in top cover 10. Access to the interior of the case is gained by removal of the mentioned screws.

A slotted round post 14 is fixed inside the case and is made integral with the interior wall 15 of the bottom cover 11 on which it is centrally positioned. The upper end of post 14 is turned down so as to provide a shoulder 16 and this same end of the post is bored out to provide a cylindrical cavity as at 17 whose purpose is later described. In further reference to post 14, it will also be noted that the mentioned slot indicated at 18 extends beyond the cavity 17 and terminates slightly above the bottom cover wall 15. Also made integral with the bottom cover 11 is a somewhat annular shaped boss 20 that rises from wall 15.

A lower disc 21 is provided for supporting the flexible coil tension spring 22 which has one end 25 fixed in slot 18. As indicated in the drawings, disc 21 is mounted by means of a hole in its center on the base of post 14 and lays against boss 20. In addition to its other functions, disc 21 acts to segregate spring 22 and tape 23 and also assists in aligning the coils of the measuring tape 23. Tension spring 22 is preferably of less width than the measuring tape shown at 23 to which it may be joined by any suitable means, the connection 24 merely being an example. It is to be especially noted that the tension spring and the tape are joined directly without use of the conventional drum between the tension spring and tape.

The end of tape 23 extends through the case tape slot and is provided at the slot with the usual handle 26 which serves both as a handle and as a means of preventing entry of the zero end of the tape through the slot and into the case once assembled. After lower disc 21, tape 23 and tension spring 22 have been assembled in the bottom cover 11 in the manner described and as shown in the drawings, a top disc 27 having a hole at its center corresponding to the diameter of post 14 is placed so as to lay against the exposed edges of the tape 23. In this position, the central portion of disc 27 is preferably just slightly spaced from shoulder 16 of post 14 and as noted particularly in FIGURE 5, the end of post 14 will be found to extend a substantial distance through the disc 27. From this description it will be seen that any pressure that is applied to disc 27 will tend to be impressed against the edges of the tape adjacent disc 27 and will thus tend to restrain the tape between disc 27 and wall 15. At this point, the description turns to the means for maintaining such a pressure against disc 27 and for releasing such pressure.

The structural members previously referred to may be thought of as the bottom cover sub-assembly and in fact such parts are preferably assembled and removed for repairs as a sub-assembly. Complementary to this bottom cover sub-assembly is the top cover sub-assembly which includes the top cover 10, a push button 30, a flexible leaf spring 31, and a collar 32. Push button 30 includes a circular head portion 33, a stub portion 34, a stem portion 35 and a friction pin 36 which acts to hold the top cover sub-assembly together.

Figure 7:
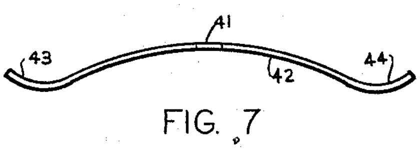
FIGURE 7 is a perspective view of a leaf spring employed in the invention.

With special reference to top cover 10, it will be noted that the central outside portion of cover 10 is formed as a bulge as indicated by the thickened cross section 37. This bulge portion provides a circular well that is formed by wall 38 and which is adapted to receive the circular head portion 33 of push button 30 in a free slidable relation. Beneath the described well there is a hole formed by wall 39 which is concentric with wall 38 but is of less diameter. In forming the top cover assembly, the push button 30 is first placed loosely in position in the described well with the stem portion 35 extending through to the interior of cover 10 and in such position, the head portion 33 will be limited in travel by the ledge 40. Leaf spring 31 is next mounted inside top cover 10 with the stem portion 35 extending through the hole 41 provided in the center of leaf spring 31. As best shown in FIGURE 7, leaf spring 31 is formed as an arc 42 in its middle with the ends being formed as oppositely turned arcs 43, 44. In mounting leaf spring 31, arc 42 is curved towards the interior of the case and arcs 43, 44 are both curved towards the exterior of the case.

With leaf spring 31 in position and residing against the stub portion 34, collar 32, which also includes a hole at its center, is mounted on stem portion 35 after which friction pin 36 is fixed in the hole 45 provided in stem portion 35 which completes the top cover sub-assembly. Looked at from the interior of cover 10, this sub-assembly appears as in FIGURE 4.

Figure 4:
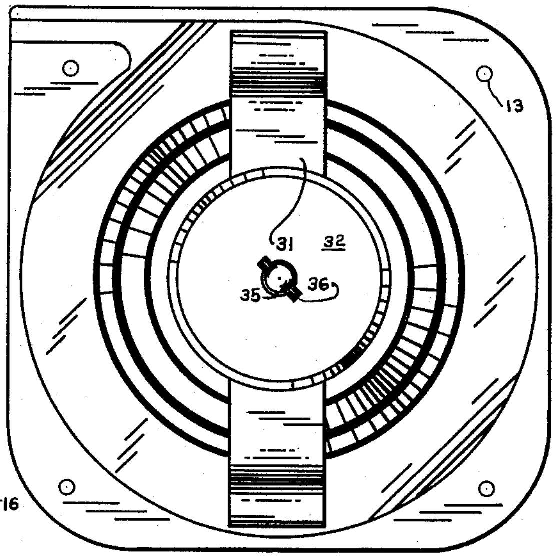
FIGURE 4 is a plan view showing the bottom side of the top cover of the rule.
Figure 6:
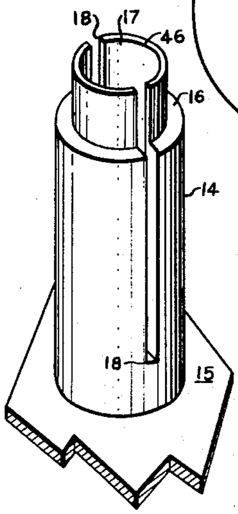
FIGURE 6 is a fragmentary perspective view of a post employed in the invention.
Figures 5, 8:
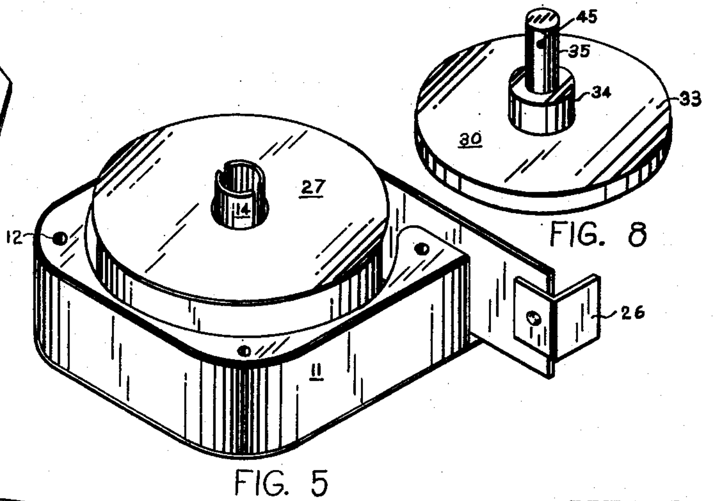
FIGURE 5 is a perspective view taken without the top cover and showing the braking disc in position.
FIGURE 8 is a perspective view of a push button employed in the invention, the button being shown inverted.

In assembling the top cover assembly of FIGURE 4, with the bottom cover assembly of FIGURE 5, friction pin 36 is guided into the slot 18 and stem portion 35 is guided into the cavity 17 of post 14 after which top cover 10 is assembled in matching relation with bottom cover 11. In making this final assembly, collar 32 will be brought to bear against the end surface 46 (FIGURE 6) of post 14 and leaf spring 31 will be, in effect, clamped between collar 32 and the outer cover 10 at the two points A and B. With the covers 10, 11 fastened together, leaf spring 31 will automatically be placed in tension and will cause disc 27 to press tightly against the edges of tape 23 so as to effect the desired braking action. At the same time the outer surface of button 30 is brought into planier relation with the outer surface of top cover 10 as best shown in FIGURE 1 which shows the rule elements as they appear when braking action is applied.

Figure 2:
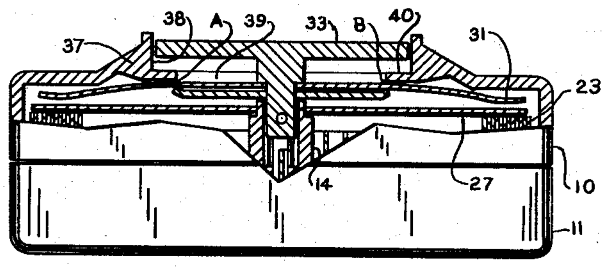
FIGURE 2 is a fragmentary elevation section view taken through the center of the rule showing the tape released from braking action.
Figure 3:
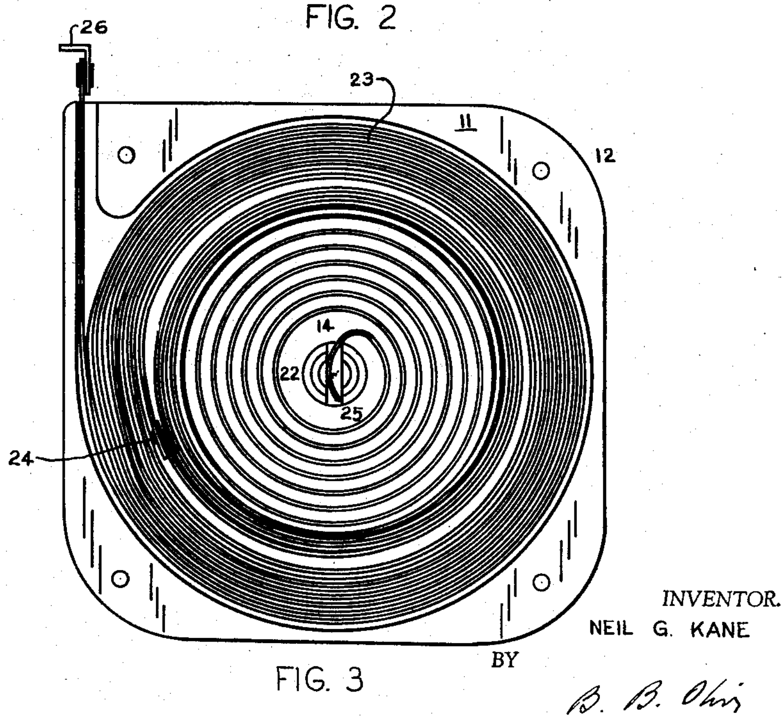
FIGURE 3 is a plan view taken with the top cover and the braking disc of the rule removed.

To use the tape rule, button 30 is depressed as in FIGURE 2 which causes the stem portion 35 to go further into the cavity 17 of post 14 and the collar 32 to bear firmly against the end surface 46 of post 14. At the same time, the stub portion 34 will bear firmly against the center of leaf spring 31 and will tend to flatten arc 42 and effect a pivoting action around points A and B which causes the end arcs 43, 44 to lift from disc 27 and thus free it from the tension of leaf spring 31. The tape 23 may now be freely extended to any desired position and when in the desired position may be held there by releasing button 30 whereby to allow leaf spring 31 to resume its tensioning position.

Having described my invention, I claim:

1. In a flexible tape rule the combination of a case including a tape slot; post means fixedly mounted within said case and extending from one side thereof; a tape retracting spring coiled in said case around said post means and having one end fixed thereto; a measuring tape coiled around said retracting spring and having one end connected directly to said retracting spring and the other end extending through said slot, said tape having one edge in frictional engagement with the said one side of said case to which said post means is fixed and the other edge laterally spaced from the other side of said case; a thin disc loosely mounted in said case and engaging said other edge; a deformable braking spring mounted within said case adjacent and normally engaging said disc and effective to brake said tape by reason of forcing said disc against said other edge; and push button means movably mounted in said case opposite said disc and having a portion thereof engaging said braking spring, inwardly movement of said push button means being effective to deform said braking spring and release said tape.

2. In a flexible tape rule as claimed in claim 1 wherein said braking spring comprises a leaf spring curved towards said disc and having its ends in contact therewith and said push button means is effective to lift said ends.

3. In a flexible tape rule as claimed in claim 1 wherein said rule includes an additional disc loosely mounted on said post adjacent said one side and adapted to provide a bearing surface for said retracting spring and an aligning surface for said measuring tape.

4. In a flexible tape rule as claimed in claim 1 wherein said post and push button means are adapted to engage each other in slidable relation.

References Cited in the file of this patent

UNITED STATES PATENTS

| | | |
|---|---|---|
| 1,945,842 | Witchger | Feb. 6, 1934 |
| 2,080,815 | Gasstrom | May 18, 1937 |
| 2,559,111 | Carroll | July 3, 1951 |
| 2,893,656 | Carlson | July 7, 1959 |